United States Patent [19]
Lichtwardt et al.

[11] Patent Number: 6,042,701
[45] Date of Patent: Mar. 28, 2000

[54] SOLAR-POWERED DIRECT CURRENT ELECTRODIALYSIS REVERSAL SYSTEM

[75] Inventors: Mark Allen Lichtwardt; David Michael Williams, both of Lakewood, Colo.

[73] Assignee: The United States of America, as represented by the Secretary of the Interior, Washington, D.C.

[21] Appl. No.: 09/005,826

[22] Filed: Jan. 12, 1998

[51] Int. Cl.[7] ............................. C25B 15/00; C25D 21/00
[52] U.S. Cl. ........................................ 204/229.6; 204/663
[58] Field of Search ............................. 204/228.1, 228.3, 204/228.4, 229.4, 229.6, 257, 663, 525

[56] References Cited

U.S. PATENT DOCUMENTS

| | | | |
|---|---|---|---|
| 3,925,184 | 12/1975 | Cave | 204/229 |
| 4,036,724 | 7/1977 | Binder et al. | 204/432 |
| 4,115,225 | 9/1978 | Parsi | 204/525 |
| 5,512,145 | 4/1996 | Hollenberg | 205/628 |
| 5,736,023 | 4/1998 | Gallagher et al. | 204/524 |

*Primary Examiner*—Kathryn Gorgos
*Assistant Examiner*—Wesley A. Nicolas
*Attorney, Agent, or Firm*—E. Philip Koltos

[57] ABSTRACT

An electrodialysis system for desalting water is powered from a direct current power source. The system includes solenoid activated reversing controls and incorporates features which enable the system to operate unattended for continuous (24 hours per day) periods while still using minimal power. A microcontroller unit and a field circuit board control all reversing functions and fail-safe modes. The flow control portion of the system provides for flushing the system electrodes with product water so that chlorine gas generated during the electrodialysis process is picked up by the product water stream.

13 Claims, 3 Drawing Sheets

SOLAR-POWERED DIRECT CURRENT ELECTRODIALYSIS REVERSAL SYSTEM

BACKGROUND

1. Field of the Invention

The present invention relates to direct current (DC) powered electrodialysis reversal systems, and in particular, to a solar-powered DC system with low power requirements and the ability to operate unattended for extended periods.

2. Prior Art

A water treatment system that uses solar-powered electrodialysis reversal was previously developed by the United States Bureau of Reclamation. This system used alternating current (AC) power for reversing controls. This system has proved to be too power intensive due to the losses that occur in converting DC power from the solar-power modules into AC power to run the controls. A discussion of this system is provided in Eisenhauer, R. J., and L. A. Haugseth, "Solar Photovoltaic Electrodialysis Demineralization of Brackish Water," U.S. Department of the Interior, Bureau of Reclamation, Interim Report, October 1983.

Another solar-powered electrodialysis system is disclosed in Lundstrom, J. E., "Water Desalting by Solar Powered Electrodialysis," Desalination, 1979. However, because this system is non-reversing, the membranes stack fouls and the system must be cleaned with chemicals on a regular basis. Consequently, the operating and maintenance requirements are high, and the system is not capable of running unattended for long periods of time.

Accordingly, the need exists for a water desalting system that overcomes the disadvantages of the prior art systems mentioned above.

SUMMARY OF THE INVENTION

According to the present invention, an electrodialysis reversal desalting system is provided that operates solely on DC power, has low power requirements and is able to operate unattended for extended periods. As discussed below, the system also includes advantageous reversing controls and the ability to provide disinfecting of the feed water.

The requisite DC power is preferably supplied by converting solar energy to DC power using photovoltaic modules, but this DC power source can be complemented, or replaced entirely, by a DC battery. Other renewable energy sources such as a wind turbine may also be used. The DC power is provided to the controls for the system and ultimately to the electrical stages of a membrane stack. Each electrical stage comprises a pair of electrodes that form a cathode and an anode. Disposed between the electrode is a plurality of cation transfer membranes and anion transfer membranes. These transfer membranes allow cations and anions, respectively, to pass, so that alternating regions of ion-free, desalted product water are produced. The polarity applied to the electrodes is periodically reversed to switch the position of the cathode and anode. This flushes the membranes to prevent scaling and fouling, and also switches the regions where the desalted product water flows.

According to a preferred embodiment of the invention, a system is provided for desalting a feed water source containing anions and cations from salt dissolved in the feed water, the system comprising: a membrane stack comprising of at least one electrical stage, the electrical stage comprising of an anode electrode of positive polarity, a cathode electrode of negative polarity, and at least one cation transfer membrane and at least one anion transfer membrane, the membranes being disposed between the electrodes such that when feed water is fed between the electrodes, cations in the feed water pass through the cathode transfer membrane to the cathode electrode while being blocked from passing through the anion transfer membrane, and anions in the feed water pass through the anion transfer membrane to the anode electrode while being blocked from passing through the cation transfer membrane, such that the feed water is separated into a desalted product water portion and a remaining portion water; polarity reversing means for temporarily reversing the polarities of the electrodes so as to remove salts that accumulate on the cation transfer membrane and salts that accumulate on the anion transfer membrane; an electrically controlled feed pump for pumping feed water through the membrane stack; an electrically controlled flow control means for controlling the flow paths of the product water portion and the remaining portion of said feed water after said portions exit from the membrane stack, and a direct current power source for supplying direct current to the electrodes, the polarity reversing means, the feed pump and the flow control means.

In one advantageous embodiment, the direct current power source includes a photovoltaic module, while, in another, the direct current power source includes a wind turbine.

In a preferred implementation where the direct current power source includes a photovoltaic module, a battery is connected to the photovoltaic module to complement the photovoltaic module in supplying direct current to the system.

The membrane stack preferably comprises a plurality of the cation transfer membranes and a plurality of the anion transfer membranes. Advantageously, the plurality of cation transfer membranes and anion transfer membranes extend substantially parallel to each other, and are interleaved, i.e., are disposed in an alternating fashion.

Preferably, the system further comprises a first power supply, connected to the direct current power source and to the feed pump, for supplying a voltage to the feed pump related to the output voltage produced by the direct current power source. An adjustable means, such as a potentiometer, provides manual adjusting of the voltage supplied by the first power supply to the feed pump so as to adjust the amount of feed water pumped to the membrane stack by the feed pump.

Advantageously, the system further comprises a circuit board including switching controls for the system and a microcontroller unit including a programmable microprocessor for transmitting signals to, and receiving signals from, the circuit board to control operation of the system, including all reversing functions and fail-safe modes. The circuit board preferably comprises a field control board and the controls include input/output relays and switches removably mounted on the field control board. Advantageously, the system further comprises a second power supply, connected to the direct current power source, for supplying power to the circuit board and microcontroller unit.

The polarity reversing means preferably comprises a relay for each electrical stage in the membrane stack, and the system further comprises a third power supply connected to the direct current source and including an output for each electrical stage, and manual adjustment means, such as a potentiometer, for manually adjusting the power supplied by the third power supply, the manual adjustment means being connected to each electrical stage through a relay.

Preferably, the system further comprises a product water storage container, and the flow control means includes flow directing means for directing the product water portion of the feed water to the product storage container and for directing the remaining portion of the feed water to waste. Advantageously, the flow directing means comprises solenoid valve means for providing alternate flow paths for the product water portion and the remaining portion, when the polarity reversing means is activated and deactivated.

According to a further important feature of the invention, the flow control means comprises means for directing a part of the product water portion to the membrane stack to cleanse the anode and cathode electrodes and to capture any chemicals that can provide disinfection of the product water portion. In this way, i.e., by flushing the electrodes with product water, the chlorine gas generated during the electrodialysis process is picked up by the product water stream.

Preferably, the system further comprises a filter for removing particles from the feed water pumped by said feed pump before the feed water is passed through the membrane stack. The direct current power source preferably comprises means for deactivating the system when insufficient voltage is provide by the direct current power source.

Advantageously, a detector means is provided for detecting pressure in a connection between the feed pump and the membrane stack and for deactivating the system when a pressure below predetermined level is detected in that connection.

Other features and advantages of the invention will be set forth in, or apparent from, the following detailed description of the preferred embodiments of the invention.

DETAILED DESCRIPTION OF THE PREFERRED EMBODIMENTS

Figure 1:
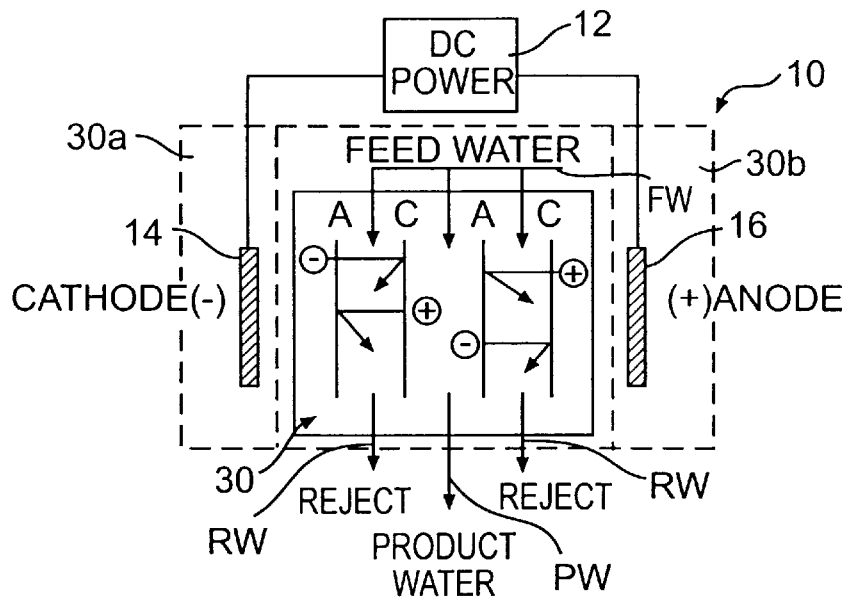
FIG. 1 as a schematic illustration of the membrane stack of the electrodialysis system of the invention in a first mode of operation.

Referring to FIG. 1, there is shown a portion of a solar-powered electrodialysis reversal system which uses only DC power. It will be understood that electrodialysis systems are, of course, well known and that the electrodialysis portion of the invention shown in FIG. 1 (and in FIG. 2) is basically conventional. The system, which is generally denoted 10 incudes a DC power unit or source 12 that is connected to a membrane stack 30 including a pair of electrodes 14 and 16. In FIG. 1, electrode 14 is the cathode and electrode 16 is the anode. Disposed between the electrode pair 14, 16 are a plurality of cation transfer membranes C and a plurality of anion transfer membranes A, positioned in an alternating fashion and in parallel to each other. Both electrodes 14, 16 are disposed in parallel with each other and with cathode transfer membranes C and anode transfer membranes A and are disposed in electrode compartments or chambers 30a and 30b.

During operation as depicted in FIG. 1, feed water source input is provided such that feed water FW flows in a direction parallel to the cation transfer membranes C and anion transfer membranes A. As the feed water FW passes by the membranes, a DC voltage is applied by DC power unit 12 so that the positive ions (+) or cations are attracted towards the negatively charged cathode 14 and the negatively charged ions (−) or anions are attracted towards the positively charged anode 16. As the name suggests, the cation transfer membranes C allow the cations to pass through the membrane towards cathode 14. Anion transfer membranes A prevent passage of cations. Similarly, anion transfer membranes A allow the passage of anions towards anode 16 while the cation transfer membranes C do not allow passage of anions.

Since the cation transfer membranes C and the anion transfer membranes A are disposed in an alternating fashion, application of a DC voltage by DC power unit 12 causes both the cations and anions to be trapped in specific regions between transfer membranes such that ion-free regions of product water PW are disposed between ion-rich regions of reject water RW. FIG. 1 illustrates the movement of ions (+, −) by arrows after a DC voltage is supplied to system 10 for the situation shown, i. e., wherein two cation transfer membranes C and two anion transfer membranes A are disposed in an alternating manner so as to create a center channel of product water PW. However, the size of a complete membrane stack, i.e., the number of membranes employed, and the number of electrical stages, varies depending on the quality of the water to be treated. Generally, a stack of cation transfer membranes C and anion transfer membranes A will consist of 100 or more of each type of membrane.

Figure 2:
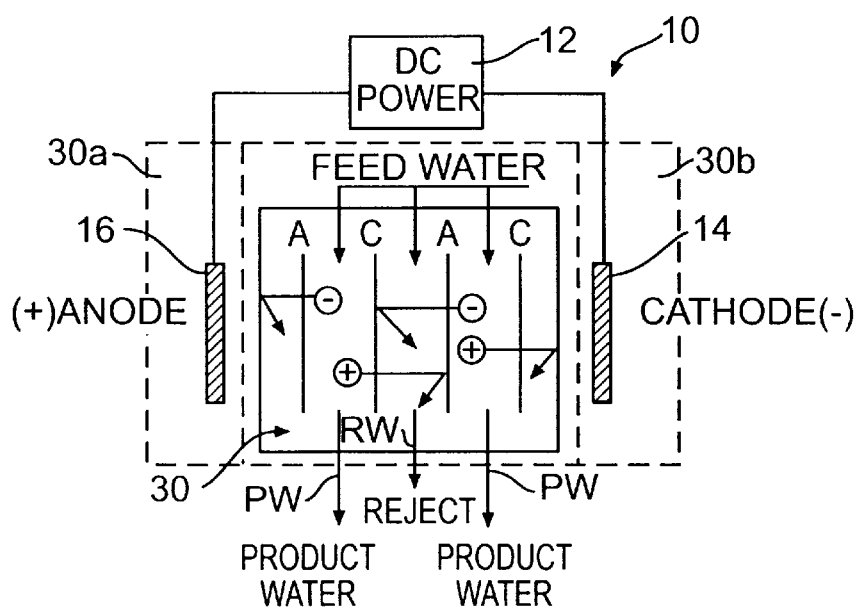
FIG. 2 is a schematic illustration similar to FIG. 1 showing another mode of operation.

FIG. 2 illustrates the identical configuration of the membranes stack 30 relative to electrode pair 14, 16. However, the position of cathode 14 and anode 16 are reversed by reversing the polarity applied by DC power unit 12. The polarity of electrode pair 14, 16 is periodically reversed or switched so that the ions that have built up on the electrode are repelled upon reversing the polarity. This also flushes the membranes so as to prevent scaling and fouling of the membranes. It should be noted that during the reversal phase depicted in FIG. 2, the regions of product water PW and reject water RW are also switched as compared to that depicted in FIG. 1 so that the center channel of FIG. 2 outputs reject water RW.

Figure 3:
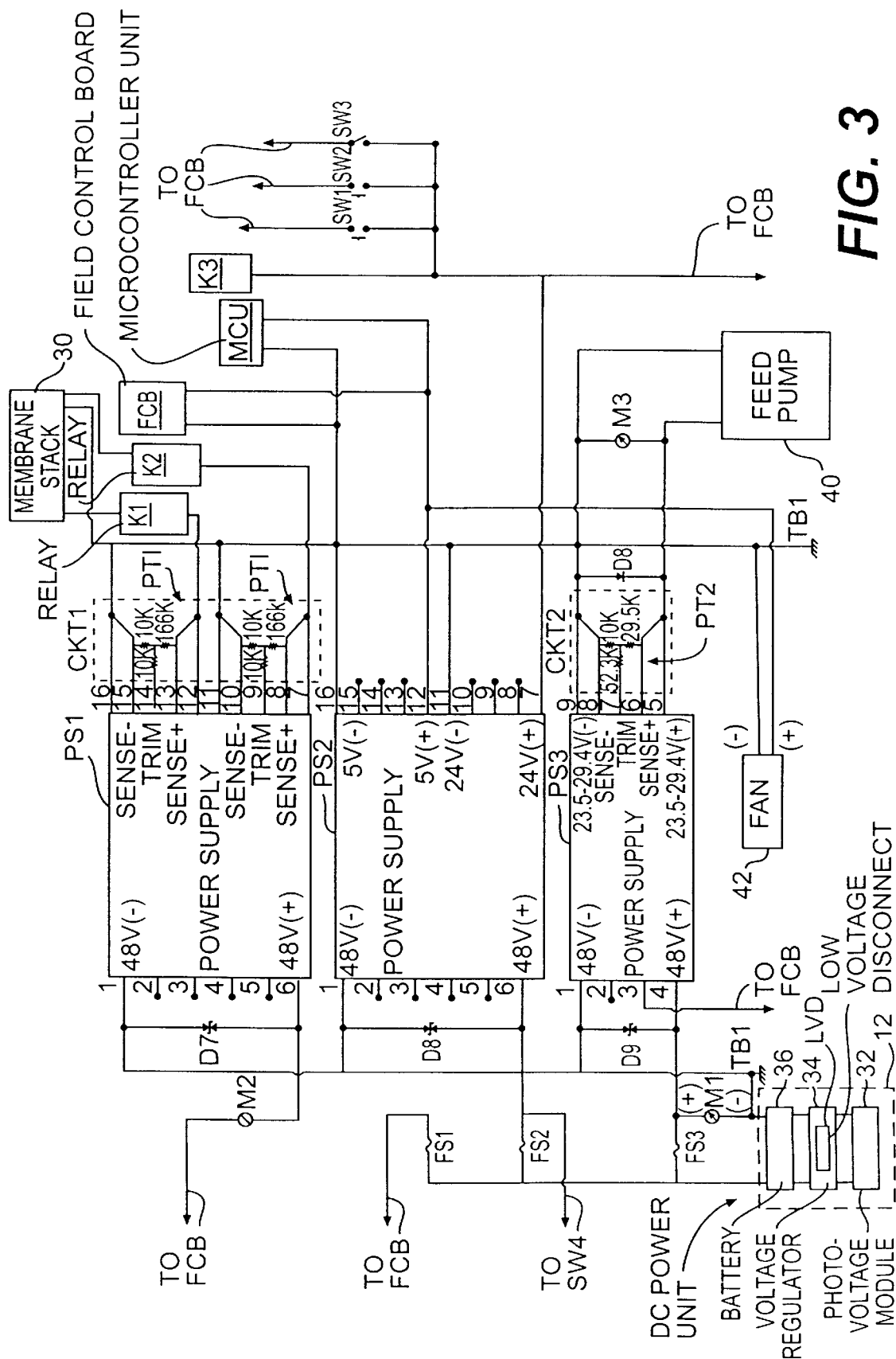
FIG. 3 is a block diagram of the electrical component of a preferred embodiment of the electrodialysis system of the invention.

FIG. 3 illustrates a preferred embodiment of the electrical components of the system of the invention. In this embodiment, DC power source or unit 12 comprises a photovoltaic module 32 connected to a voltage regulator 34. Photovoltaic module 32 is connected through the voltage regulator 34 to a battery or battery bank 36. The output of battery 36 is connected to three DC-DC power supplies PS1, PS2 and PS3.

Photovoltaic module 32 converts energy from the sun to electrical DC power through a plurality of solar cells (not shown) that are selected and configured to match the desired battery voltage. The electric current is generated in the cells when radiant energy in the form of sunlight falls on the bourdary of two dissimilar materials. This power is used to power the system directly when solar conditions are good, or stored in the battery 36 to supply DC power to system 10 entirely through battery 36 when solar conditions are not good. Alternatively, battery 36 can be used to continuously complement the power supplied by photovoltaic module 32.

Voltage regulator 34 regulates the voltage output of photovoltaic module voltage, which is 48 volts in a specific non-limiting embodiment. Voltage regulator 34 provides an upper and a lower set point, and includes a low voltage disconnect feature LVD, which serves to shut off system 10 if solar conditions are poor for an extended period of time, and the battery 36 becomes drained. Battery 36 allows for 24 hour per day operation, and provides storage for periods of poor insolation.

In the non-limiting embodiment referred to above, DC power unit 12 supplies 48 volts to a multiple output DC-DC power supply PS1 that converts the 48 volts to a voltage suitable for powering a pair of eight-pin polarity reversing relay stages K1 and K2. Relays K1 and K2 are used to reverse the polarity of the electrical stages (not shown) in membrane stack 30 to prevent fouling of the membrane stack 30. If more than two electrical stages are required in membrane stack 30, additional relays can be added as well as additional outputs on power supply PS1.

Connected to the outputs of power supply PS1 is a voltage trimming circuit CKT1 including a pair of potentiometers PT1 which allow manual adjustment of the voltage/current applied to each of the electrical stages in the membrane stack 30. This permits an operator to optimize the efficiency of membrane stack 30, and therefore, obtain any desired product water quality.

Power supply PS2 is a single DC-DC power supply with a pair of outputs and is used to convert the 48 volts input to power supply PS2 to a 5 volt output in order to power a microcontroller unit MCU, and a field control board FCB. The microcontroller unit MCU contains a programmable microprocessor that operates on assembly language instructions to control all functions of system 10 by sending and receiving signals from field control board FCB. Field control board FCB is a circuit board that has input and output plug-in modules. The output modules receive signals from microcontroller unit MCU, and the input modules send signals to the microcontroller unit MCU based on the position of a plurality of external switches SW1, SW2, SW3, SW4, and SW5. The microcontroller unit MCU and field circuit board FCB preferably comprise, or are comprised by, a programmable logic control (PLC) unit.

Power supply PS2 also converts the input 48 volts to a 24 volt output in order to provide power to: (1) a plurality of solenoid valves SOV1, SOV2, and SOV3 controlled by field control board FCB, (2) relays K1 and K2, (3) a further relay K3 and (4) switches SW1, SW2 and SW3.

Relay K3 includes a time-delay relay providing an auto-restart feature. The auto-restart feature operates, i.e., is functional, if solar conditions are poor for an extended period of time sufficient to cause battery 36 to become drained which, in turn, causes the low voltage disconnect LVD in the voltage regulator 34 to shut system 10 off. Power is restored to system 10 when solar conditions improve and battery 36 returns to normal voltage, which allows relay K3 to apply power to a start circuit (not shown) for a set amount of time. The time can be manually adjusted in relay K3 and must be set long enough for pressure to build so that system 10 can start. The switches SW1 and SW2, which are located between power supply PS2 and the field control board FCB, are a push button start switch, and a push button stop switch, respectively. Switch SW3 is a two position switch and is also located between power supply PS2 and an input module on field control board FCB. This switch allows an operator to disconnect power to the electrical stages of membrane stack 30.

Power supply PS3 is a DC-DC power supply that converts the output voltage to between 23.5–29.4 volts. A 24 volt feed pump 40 for pumping feed water FW into membrane stack 30 is connected to power supply PS3. The flow rate of the feed pump 40 is controlled by manually adjusting a potentiometer PT2 of a voltage trimming circuit CKT2 located at the output of power supply PS3. A fan 42 is also connected to power supply PS2 in order to provide a cooling air flow for PS3.

Each of the power supplies PS1, PS2 and PS3 has a unidirectional transorb device, denoted D7, D8 and D9, respectively, connected across the power supply inputs to provide lightning protection. A volt meter M1 is connected between the positive voltage side of transorb D9 and DC power unit 12. A current meter M2 is connected between the positive voltage side of transorb D7 and the field control board FCB. An elapsed time hour meter M3 is connected across the output of power supply PS3 for providing a measurement related to the activity of the feed pump 40. Also connected across the output of power supply PS3 is a diode D6. A plurality of fuses FS1, FS2 and FS3 are connected as shown to protect the electrical components. Specifically, fuse F1 is connected between power unit 12 and power supply PS1, fuse F2 is connected between power unit 12 and both power supply PS2 and switch SW4, and fuse FS3 is connected between power unit 12 and power supply PS3. Switch SW4 is a two position on/off switch for controlling activation of the auto-restart feature.

Figure 4:
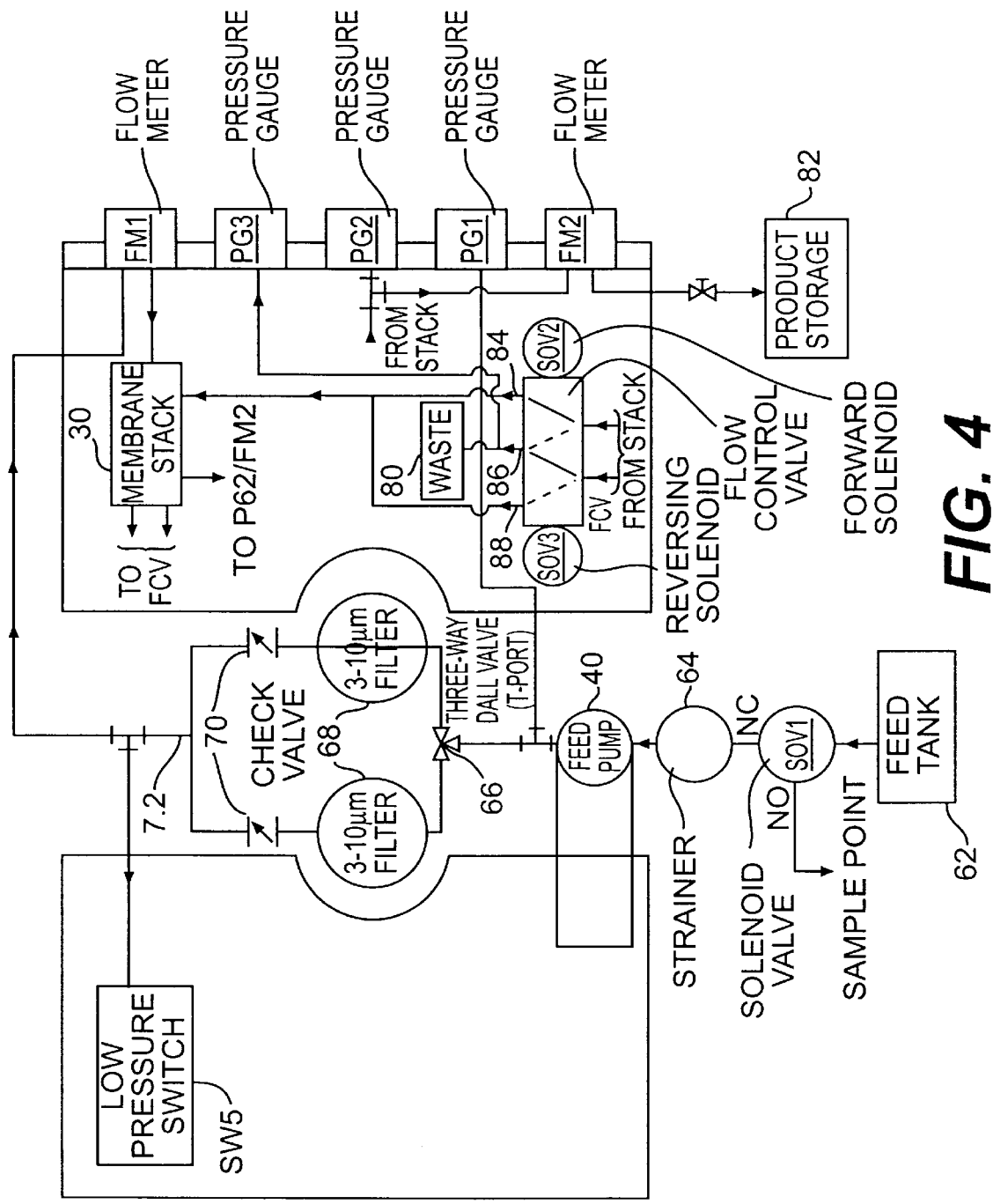
FIG. 4 is a block diagram of the plumbing components of a preferred embodiment of the electrodialysis system of the invention.

FIG. 4 illustrates the major "plumbing" components of system 10. During operation, the feed pump 40 referred to above pumps feed water FW from a feed storage tank 62 to send the feed water FW through the membrane stack 30. Feed pump 40 must provide enough pressure to overcome the pressure drop across membrane stack 30, which is on the order of 40 psi in the exemplary embodiment.

A pressure gauge PG1 measures water pressure generated by feed pump 40. Disposed between feed tank 62 and feed pump 40 is an electrically actuated valve SOV1 that is a feed water shut off solenoid valve. Feed water shut off solenoid valve SOV1 presents siphoning when the system 10 is shut down. Disposed between solenoid valve SOV1 and feed pump 40 is a strainer 64 that is used to remove solid debris from the feed water FW. After passing through feed pump 40, the feed water FW passes through a three-way T-port ball valve 66 (one input and two outputs). A pair of filters 68 are positioned after the two outputs of ball valve 66 to remove suspended solids from the feed water FW. In the exemplary embodiment, 3–10 micrometer filters were used, however, any conventional filters are suitable depending on the contents of feed water FW. Ball valve 66 is a servicing valve used when filters 68 are removed for cleaning and replacement. A pair of check valves 70 prevent back flow to filters 68 when they are removed for cleaning or replacement.

Switch SW5, which was mentioned above, is a low pressure switch located in a common line 72 downstream of check valve 70, and is used to allow field control board FCB and microcontroller unit MCU to shut system 10 off in a low pressure condition. Continuing along the line 72, a flowmeter FM 1 is located downstream from low pressure switch SW5 to measure the flow of feed water FW into the membrane stack 30. Feed water FW next passes from flowmeter FM1 through membrane stack 30 where the removal of ions generates the product water PW and the reject water RW. A flow control valve FCV directs the resulting product water PW and reject water RW to the appropriate locations. Product water PW returns to the electrode compartments or chambers 30a and 30b of the membrane stack 30 to flush the cathode 14 and anode 16 so as to prevent any salt build-up, and collect any chlorine gas generated during the desalting process which can provide disinfection. Product water PW then continues to pressure gauge PG2 and then on to a further flowmeter FM2 which measures the flow of potable water into a product storage tank 82. Reject water RW is then sent to a waste storage container 80, and also simultaneously passes through a pressure gauge PG3.

Flow control valve FCV is shown as having two inputs from membrane stack 30. These inputs are used in the reversing operation described above to direct the product water PW and reject water RW to the appropriate tanks by activating the forward solenoid SOV2 on the flow control valve FCV or the reversing solenoid SOV3 on the flow control valve FCV. FIG. 4 illustrates the operation described above in conjunction with FIG. 1. During the forward operation, forward solenoid flow valve SOV2 directs the product water PW to channel 84 and the reject water RW to waste tank 80 through a center channel 86. In FIG. 4, the reversing mode is shown in dashed lines and similarly corresponds to the operation described in conjunction with FIG. 2. In the reversing operational mode, the product water PW is channeled to the left, as viewed in FIG. 4, through channel 88 and the reject water is channeled again to center channel 86 (as shown by the dashed lines in FCV).

The present invention, as described above, has relatively low power consumption and can therefore operate unattended for extended periods of time. Also, by using DC power for all controls, including the reversing functions, the energy losses that occur in an inverter, used in AC systems, are eliminated. Since power consumption is directly related to the costs of the photovoltaic modules, the system of the present invention requires less capital investment than previous systems, and will be cost effective at more locations.

The present invention has been designed for continuous unattended operation by incorporating:

1) automated controls;
2) a reversing feature that keeps the membrane stack clean and prevents fouling;
3) a plumbing configuration that continuously flushes the electrodes with potable water to prevent the build-up of salts and scaling of the electrodes;
4) an automatic system shutdown feature that operates in case of an equipment failure such as broken piping, leaks, or high/low pump pressure;
5) a low voltage disconnect feature that shuts the system off if the batteries become drained due to extended periods of poor insolation;
6) an auto-restart feature that operates once solar conditions have improved and the batteries have returned to normal voltage, allowing the auto-restart time-delay relay to send a voltage to the start circuit thereby restarting the system; and
7) filters that can be cleaned or replaced without turning off the system, due to the placing of two filters in parallel so that they can be independently isolated for maintenance.

Furthermore, the system of the present invention is capable of providing some disinfection. If sodium chloride (NaCl) is present in the feed water, chlorine gas will be generated during the desalting process. Since the electrodes are continually flushed with product water, the chlorine ends up in solution in the product storage tank. The amount of chlorine generate is proportional to the salinity of the feed water.

The system has been proven reliable by being field tested for over 7,000 hours. The system can be made to be lightweight, corrosion-resistant, fully instrumented, and designed with primarily off-the-shelf components for ease of manufacturing.

Additionally, the entire system can be skid-mounted or packaged for portable use. Lastly, it should be noted that the system of the present invention has been designed so that it may be combined with a solar photovoltaic groundwater pumping system.

Although the present invention has been described to specific exemplary embodiments thereof, it will be understood by those skilled in the art that variations and modifications can be effective in this exemplary embodiments without departing from the scope and spirit of the invention.

What is claimed is:

1. A system for desalting a feed water source containing anions and cations from salt dissolved in said feed water, said system comprising:

a membrane stack comprising of at least one electrical stage, said electrical stage comprising an anode electrode of positive polarity, a cathode electrode of negative polarity, and at least one cation transfer membrane and at least one anion transfer membrane, said membranes being disposed between said electrodes such that when feed water is fed between said electrodes, cations in said feed water pass through said cathode transfer membrane to said cathode electrode while being blocked from passing through said anion transfer membrane, and anions in said feed water pass through said anion transfer membrane to said anode electrode while being blocked from passing through said cation transfer membrane, such that the feed water is separated into a desalted product water portion and a remaining portion;

polarity reversing means for temporarily reversing the polarities of said electrodes so as to remove salts that accumulate on said cation transfer membrane and salts that accumulate on said anion transfer membrane;

an electrically controlled feed pump for pumping feed water through said membrane stack;

an electrically controlled flow control means for controlling the flow path of said product water portion and said remaining portion of said feed water after said portions exit from said membrane stack, and a direct current power source for supplying direct current to said electrodes, said polarity reversing means, said feed pump and said flow control means, said direct current power source producing an output voltage, and said system further comprising a first DC-DC voltage converter, connected to said direct current power source and to said feed pump, for supplying a voltage to said feed pump related to the output voltage produced by said direct current power source, adjustable means for manually adjusting said voltage supplied by said first converter to said feed pump so as to adjust the flow rate of feed water pumped to said membrane stack by said feed pump, said adjustable means comprising a potentiometer and a plurality of resistors connected to prevent linear power losses, a circuit board including switching controls for said system and microcontroller unit including a programmable microprocessor for transmitting signals to, and receiving signals from, said circuit board to control operation of said system, and a second DC-DC voltage converter, connected to said direct current power source, for supplying power to said circuit board and said microcontroller unit, said polarity reversing means comprising a relay for each electrical stage in said membrane stack, and said system further comprising a third DC-DC voltage converter connected to said direct current source, and including an output for each electrical stage and manual adjustment means for manually adjusting power supplied by said third converter, said manual adjustment means being connected to each said electrical stage through a said relay, and said manual adjustment means comprising a potentiometer and a plurality of resistors connected to prevent linear power losses.

2. A system according to claim 1 wherein said direct current power source includes a photovoltaic module.

3. A system according to claim 1 wherein said direct current power source comprises a photovoltaic module and a battery connected to said photovoltaic module to complement said photovoltaic module in supplying direct current to said system.

4. A system according to claim 3 further comprising automatic restarting means for sensing the output of said photovoltaic module and the battery and for controlling restarting of the system, after shutdown, based on said outputs.

5. A system according to claim 1 wherein said membrane stack comprises a plurality of said cation transfer membran said a plurality of said anion transfer membranes.

6. A system according to claim 5 wherein said plurality of said cation membranes and said anion transfer membranes extend substantially parallel to each other, and are interleaved.

7. A system according to claim 1 wherein said circuit board comprises a field control board and said controls include input/output relays and switches removably mounted on said field control board.

8. A system according to claim 7 wherein said microcontroller unit and said field circuit board are comprised by a programmable logic control unit.

9. A system according to claim 1 wherein said flow control means comprises means for directing a part of said product water portion to electrode compartments of said membrane stack to cleanse said anode and cathode electrodes and capture any chemicals that can provide disinfection of said product water portion.

10. A system according to claim 9 further comprising a filter for removing particles from said feed water pumped by said feed pump before said feed water is passed through said membrane stack.

11. A system according to claim 1 wherein said direct current power source further comprises means for deactivating said system when insufficient voltage is provided by said direct current power source.

12. A system according to claim 1 further comprising detector means for detecting pressure in a connection between said feed pump and said membrane stack and for deactivating the system when a pressure below a predetermined level is detected in said connection.

13. A system for desalting a feed water source containing anions and cations from salt dissolved in said feed water, said system comprising:

a membrane stack comprising of at least one electrical stage, said electrical stage comprising an anode electrode of positive polarity, a cathode electrode of negative polarity, and at least one cation transfer membrane and at least one anion transfer membrane, said membranes being disposed between said electrodes such that when feed water is fed between said electrodes, cations in said feed water pass through said cathode transfer membrane to said cathode electrode while being blocked from passing through said anion transfer membrane, and anions in said feed water pass through said anion transfer membrane to said anode electrode while being blocked from passing through said cation transfer membrane, such that the feed water is separated into a desalted product water portion and a remaining portion;

polarity reversing means for temporarily reversing the polarities of said electrodes so as to remove salts that accumulate on said cation transfer membrane and salts that accumulate on said anion transfer membrane;

an electrically controlled feed pump for pumping feed water through said membrane stack;

an electrically controlled flow control means for controlling the flow paths of said product water portion and said remaining portion of said feed water after said portions exit from said membrane stack, and a direct current power source for supplying direct current to said electrodes, said polarity reversing means, said feed pump and said flow control means, said system further comprising a product water storage container, and said flow control means including flow directing means for directing said product water portion of said feed water to said product storage container and for directing said remaining portion of said feed water to waste, said flow directing means comprising solenoid controlled valve means, comprising a single valve and first and second solenoids, for providing alternate flow paths for said product water portion and said remaining portion when said polarity reversing means is activated and deactivated, and said flow control means further comprising means for directing a part of said product water portion to electrode compartments of said membrane stack to cleanse said anode and cathode electrodes and capture any chemicals that can provide disinfection of said product water portion.

* * * * *